United States Patent [19]

Shimada

[11] 4,372,998
[45] Feb. 8, 1983

[54] HEAT ADHESIVE TAPES FOR FINISHING HEMS OF TROUSERS, SKIRTS AND LIKE ARTICLES

[75] Inventor: Yukio Shimada, Toyonaka, Japan

[73] Assignee: Shimada Shoji Co., Ltd., Osaka, Japan

[21] Appl. No.: 181,547

[22] Filed: Aug. 26, 1980

[51] Int. Cl.³ ............................................. B32B 23/02
[52] U.S. Cl. ....................................... 428/193; 2/232;
2/269; 2/274; 2/400; 66/202; 139/117;
156/306.6; 156/324.4; 428/192; 428/212;
428/229; 428/253; 428/225
[58] Field of Search ............... 428/192, 193, 229, 233,
428/253, 257, 212, 194, 196, 197; 2/400, 232,
269, 274; 156/157, 291, 306.6, 324.4; 66/202;
139/383, 420, 430, 117

[56] References Cited

U.S. PATENT DOCUMENTS

| | | | |
|---|---|---|---|
| 1,462,279 | 7/1923 | Guinzburg | 2/400 |
| 3,575,760 | 4/1971 | Goldstein et al. | 156/306.6 |
| 4,320,634 | 3/1982 | Hashimoto et al. | 66/202 |

Primary Examiner—James J. Bell
Attorney, Agent, or Firm—Jordan and Hamburg

[57] ABSTRACT

A heat adhesive tape comprising a tape main body of heat-resistant woven or knitted fabric and a heat adhesive thread of thermoplastic resin provided at each side of the main body on one surface thereof. To form a finished hem on trousers, skirts or the like, the tape is placed on the main body of the hem portion and on a folded-back portion of the hem portion and then heat-pressed as by ironing. The heat adhesive thread is woven or knitted into the main body zigzag in a staggered or wavy form or in the form of a series of turns and is thereby made almost free of shrinkage longitudinally of the tape when heat-pressed. A thermoplastic resin thread meltable at a lower temperature than the adhesive thread and fastening the thread to the main body at its furrow portions melts before the adhesive thread during heat pressing so as not to permit the adhesive thread to exert a shrinkage force on the main body also widthwise thereof when the tape is heat-pressed.

22 Claims, 7 Drawing Figures

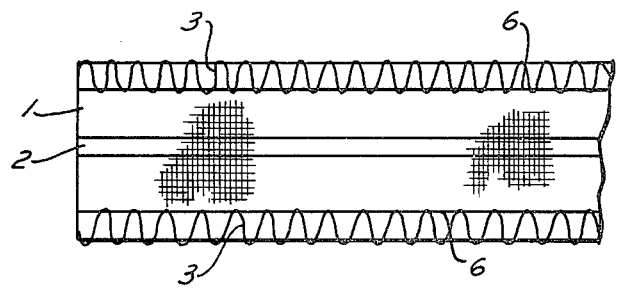
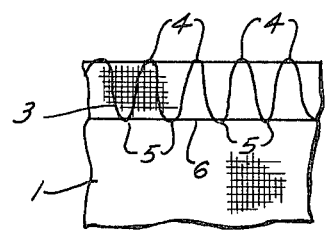
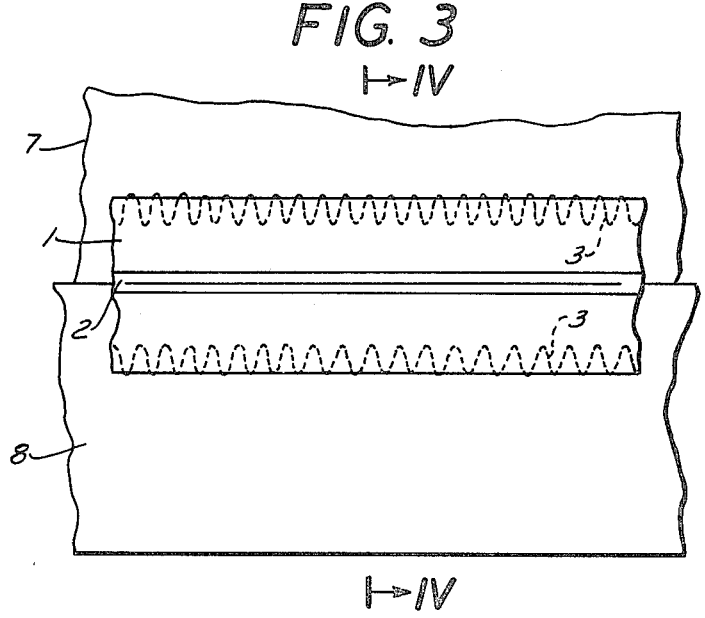

FIG. 5
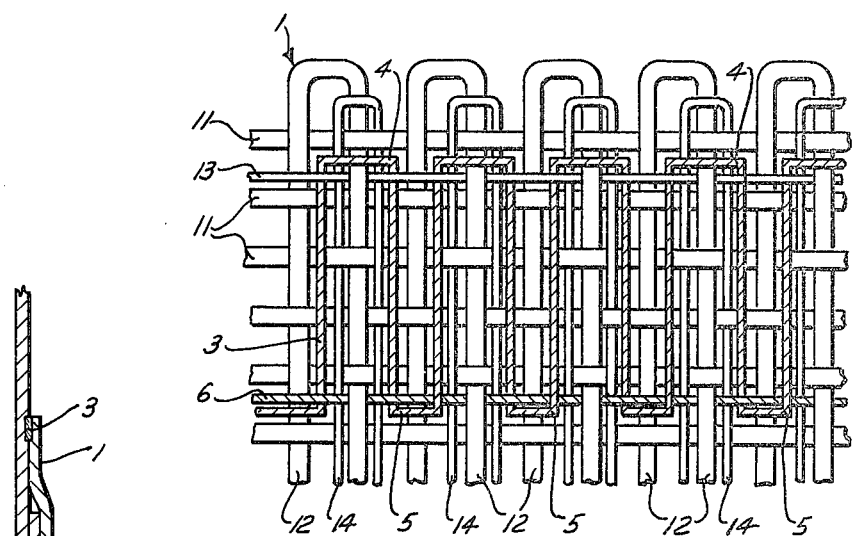
FIG. 4
FIG. 6
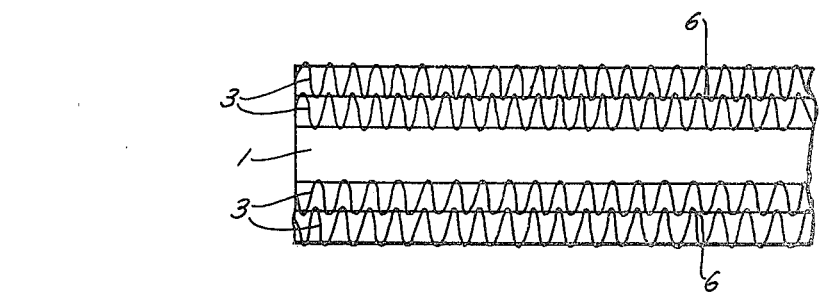

HEAT ADHESIVE TAPES FOR FINISHING HEMS OF TROUSERS, SKIRTS AND LIKE ARTICLES

BACKGROUND OF THE INVENTION

This invention relates to heat adhesive tapes for finishing the hems of trousers, skirts, etc.

Edges of trousers, skirts, curtains and like articles are finished usually by folding back the edge and stitching it down on the main body of the article as by a sewing machine. However, since this method requires much labor and is inefficient, heat adhesive tapes have recently been developed for forming hems quickly. Such a tape is placed on both the folded-back edge and the inner side of the main body and is adhered thereto by being heat-pressed as by an iron. The tape is provided at each side of one surface of the tape main body with a thermoplastic resin thread extending longitudinally thereof in the form of a warp. The thermoplastic resin thread has the property of shrinking when melting with application of heat and solidifying after melting, so that when the tape is heat-pressed with an iron for adhesion to the edge of the fabric, the thread inevitably shrinks before solidification. Especially when the tape is used by an unskilled person, he will carefully and gently iron the tape, permitting transfer of heat to the tape before the tape is subjected to a sufficient pressure and allowing shrinkage of the thermoplastic resin thread without preventing the shrinkage by the pressure of the iron, with the result that the tape itself is subjected to the shrinking force of the thread. Consequently the tape in which the thermoplastic resin thread is provided in the form of a warp markedly shrinks longitudinally thereof to deform or wrinkle the front side of the hem, giving an impaired finish to the hem. To overcome this problem, the thermoplastic resin thread usually has some slack between the locations where it is fastened to the tape main body so as to compensate for the shrinkage with the slack. However, this is not very effective in preventing deformation or wrinkles in practice because when the tape is ironed as applied to an edge portion of the fabric, the thermoplastic resin yarns at both sides of the tape are fused to the tape main body and to the edge portion in the original slack state, such that when the iron is removed from the tape, the yarns shrink as adhered to the fabric.

An object of this invention is to eliminate the foregoing drawbacks of conventional products and to provide a heat adhesive tape for finishing the hems of trousers, skirts, etc. easily by heat pressing with an iron or the like without resorting to stitching, the tape being capable of forming neatly finished hems by minimizing the influence of thermoplastic resin threads due to shrinkage.

Another object of the invention is to provide a heat adhesive tape which is capable of forming neatly finished hems on trousers, skirts, etc. without necessitating any special expedient or care for heat pressing or like procedure and which is therefore much easier to use than conventional tapes of the same type.

Still another object of the invention is to provide a heat adhesive tape for finishing the hems of trousers, skirts, etc. which has high durability as adhered to the hem portion.

Other objects and advantages of this invention will become apparent from the following description with reference to the accompanying drawings, in which:

BRIEF DESCRIPTION OF THE DRAWINGS

FIG. 1 is a plan view of a heat adhesive tape for finishing hems according to the present invention;

FIG. 2 is an enlarged fragmentary plan view on an enlarged of the tape shown in FIG. 1;

FIG. 3 is a plan view showing the tape shown in FIG. 1 as adhered to a hem portion;

FIG. 4 is a view in section taken along the line IV—IV in FIG. 3;

FIG. 5 is a fragmentary view of a tape according to the present invention in which the main body is made of a woven fabric, the view showing the structure of the fabric on an enlarged scale;

FIG. 6 is a plan view showing another embodiment of the present invention in which heat adhesive threads are provided in two rows at each side of the tape main body.

DESCRIPTION OF THE PREFERRED EMBODIMENTS

Figure 7:
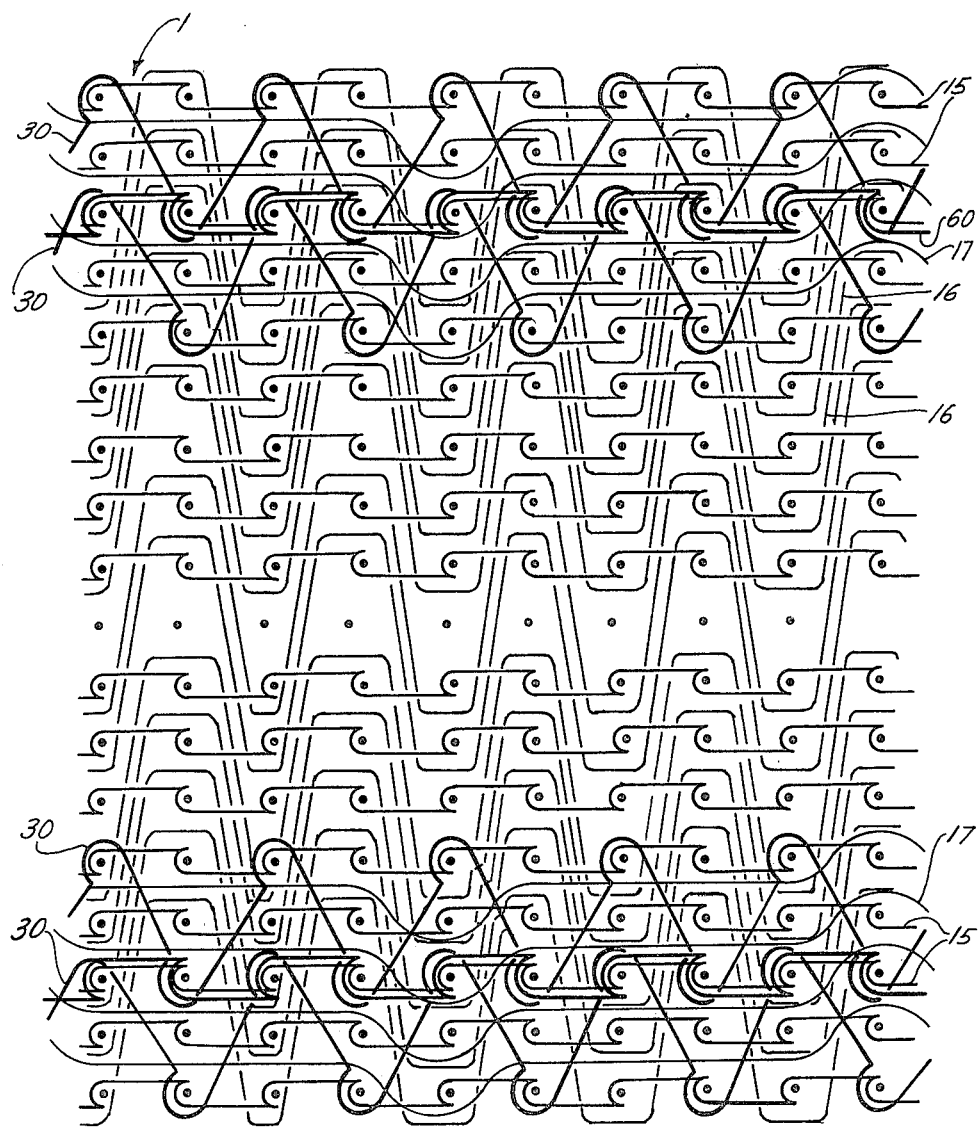
FIG. 7 is a fragmentary view of a tape according to another embodiment of the present invention in which the tape main body is made of a knitted fabric the view showing the structure of the fabric on an enlarged scale.

With reference to the embodiment shown in FIGS. 1 to 4, indicated at 1 is a tape main body in the form of a strip having a specified width and knitted or woven of yarns having heat resistance. Usually the tape main body 1 has suitable flexiblity widthwise thereof and a portion 2 of small width extending over its entire length at the center of the width thereof and having a reduced knitting or weaving density. The center see-through portion 2 thus formed is desirable, because the portion 2 renders the tape conveniently positionable in place for adhesion and gives the tape enhanced flexibility.

Over the entire length of the main body at each selvage thereof, a heat adhesive thread 3 of thermoplastic resin is woven or knitted into the main body 1 zigzag in a staggered or wavy pattern or in the form of a series of turns over a specified range of the width of the main body 1. The thread 3 is exposed from one surface of the main body and is turned where it is fastened to the main body, namely at ridges 4 and furrows 5. The thread 3 is fastened at the furrow portions 5 with a thread 6 of thermoplastic resin which is meltable at a lower temperature than the heat adhesive thread 3. Useful as the thread 6 are poval threads or vinylon threads which are soluble in warm water. The difference in melting temperature between the thermoplastic resin thread 3 for heat adhesion and the fastening thread 6 is such that when the thread 3 melts, for example, at 120° to 140° C., the fastening thread 6 melts at 60° to 80° C.

The thread 3 can be easily woven or knitted into the main body 1 by using the threads 3 and fastening threads 6 as inlay yarns on one surface of the main body 1 when weaving or knitting the main body 1.

For example, when made by weaving, the main body 1 has the woven structure of FIG. 5 at either side thereof. With reference to FIG. 5, the main body 1 is woven of warp yarns 11 and weft yarns 12 having high resistance to heat and has incorporated therein a heat adhesive thread 3 of thermoplastic resin extending in the form of a series of turns at either side of the main body 1. In the interior of the main body 1, the thread 3 is fastened at furrow portions 5 with a thread 6, such as a water-soluble vinylon yarn, extending in the direction of the warps and meltable at a low temperature. The ridge portions of the thread 3 are fastened to the main body 1 with a holding thread 13 close to the edge of the main body. Indicated at 14 are threads for covering the low-melting fastening thread 6 from the rear side to prevent the thread 6 from adhering to an iron or the like on the rear side of the main body upon melting with application of heat. Although the threads 14 appear relatively thin for the convenience of preparation of the drawing, they actually have a sufficient thickness for the covering function. Such a woven structure can be formed, for example, by a multiple shuttle Jacquard machine.

When the adhesive tape is used for forming a finished hem on trousers, skirts or the like, the tape is placed on the main body 7 of the hem portion and on a folded-back portion 8 at the lower end of the hem portion, with the adhesive thread being surface of the tape facing these portions, one selvage of the tape being opposed to the hem main body portion 7 and the other selvage thereof being opposed to the folded-back portion 8. If the tape has the widthwise central portion 2 of reduced weaving or knitting density as described above, the edge of the folded-back portion 8 can be seen through the center portion 2 to position the portion 2 on the edge. With the tape wetted with water before application, the tape main body is heat-pressed on the rear surface of the tape main body with an iron (preferably with a steam iron), whereby the thermoplastic resin thread 3 is fused between the main body 1 and both the hem main body portion 7 and the folded-back portion 8. When the iron is thereafter removed, the threads 3 solidify on cooling, adhering the tape main body 1 and portions 7 and 8 together. During the heat pressing, the thread 6 fastening the heat adhesive thread 3 melts before the thread 3 melts since the thread 6 melts at a temperature (of 60° to 80° C. in the embodiment) lower than the melting temperature (of 120° to 140° C. in the embodiment) of the thread 3. Accordingly when shrinking after melting, the heat adhesive thread 3 is released from the main body 1 at the furrow portions and restrained by the main body 1 only at the ridge portions along the edge thereof. Consequently the thread 3 alone is allowed to shrink widthwise of the tape main body 1 outward toward its edge without applying a shrinking force to the main body 1.

Stated more specifically, the thermoplastic resin thread 3, which is shrinkable and is provided as a widthwise weft, is almost free of shrinking lengthwise between the fastened portions 4,4 and also between the fastened portions 5, 5. Between the fastened portions 4 and 5, on the other hand, the thread exerts a widthwise shrinking force acting to somewhat roll up the edge of the tape main body 1, but since the thread 6 fastening the furrow portions 5 has melted and released the furrow portions 5 from fastening engagement before the heat adhesive thread 3 shrinks after melting, the thread 3 alone shrinks toward the edge of the tape main body 1, with the result that the thread 3 does not substantially deform or otherwise influence the front side of the hem portion but very neatly adheres the tape main body 1 to the hem main body 7 and to the folded-back portion 8.

Although the thermoplastic resin thread 3 is provided in a single row at either selvage of the tape main body 1 in the foregoing basic embodiment, thermoplastic threads 3 may be provided in two parallel rows as seen in FIG. 6, in which case a low-melting thread 6 is used as a warp for fastening the furrow portions of the first row and the ridge portions of the second row to the tape main body 1. When the tape of this construction is heat-pressed for adhesion, the low-melting fastening thread 6 melts first and releases the threads 3, permitting the thread 3 in the first row to shrink toward the edge of the main body 1 and the thread 3 in the second row to shrink inwardly of the main body 1 without exerting a shrinking force on the tape main body 1. The adhesive threads 3 disposed in two rows at each selvage of the tape main body 1 assure enhanced adhesion.

While the tape main body 1 of the embodiment shown in FIG. 5 is made of a woven fabric, FIG. 7 shows a knitted tape main body 1 having heat adhesive threads 30 of thermoplastic resin knitted thereinto in a zigzag form. The main body 1 is knitted of yarns 15 and 16 in the form of chain stitches. In the illustrated embodiment, the heat adhesive threads 30 are provided in two outer and two inner rows symmetrically at each selvage of the tape main body 1. A thread 60 meltable at a lower temperature than the threads 30 is used for fastening the furrow portions of the outer row and the ridge portions of the inner row to the main body. Indicated at 17 is an auxiliary inlay yarn. The heat adhesive threads 30 which extend zigzag are almost free of longitudinal shrinkage when the tape is heat-pressed for adhesion, while the thread 60 fastening the furrow portions of the outer row and the ridge portions of the inner row to the main body melts before the heat adhesive threads 30, so that the widthwise shrinkage will not be delivered to the tape main body 1, as is the case with the foregoing embodiment. The heat adhesive threads 30 in the inner rows may be eliminated from the knitted structure described, in which case the heat adhesive thread 60 in a single row at each selvage of the tape main body 1 is fastened at its furrow portions with a thread 60 meltable at a low temperature.

With the heat adhesive tapes for finishing hems according to this invention, at least one heat adhesive thread of thermoplastic resin is woven or knitted into the tape main body at each selvage thereof in the form of a widthwise weft, so that when the tape is heat-pressed for adhesion to a hem main body portion and folded-back portion of trousers, skirts or the like, the thread remains almost free of shrinkage longitudinally of the tape. Furthermore since the thread 6 for fastening the furrow portions 5 of the adhesive thread 3 to the tape main body 1 is meltable at a lower temperature than the thread 3, the thread 3 is free of the fastening force when shrinking and is allowed to shrink only toward the edge of the main body, thus producing little or no influence on the front side of the hem portion, which can therefore be prevented from deformation or wrinkling. Accordingly the tape of this invention is much easier to use and assures a more attractive finish than conventional tapes of the same type. The thermoplastic resin thread which extends continuously widthwise of the tape as adhered to the fabric gives enhanced bond strength to the tape against separation at its end and imparts improved durability to the finished hem. Thus the tape of this invention has various useful advantages.

What is claimed is:

1. A heat adhesive tape for forming finished hems on fabric material such as trousers, skirts or the like by the application of heat, comprising a tape main body made of heat-resistant fabric, said tape main body having a heat adhesive thread of thermoplastic resin disposed in zigzag fashion, said tape main body having incorporated therein a thermoplastic resin fastening thread for fastening said heat adhesive thread to said tape main body, said fastening thread having a lower melting temperature than the melting temperature of said heat adhesive thread, said heat adhesive thread and said fastening thread being constructed and arranged such that upon application of heat thereto said fastening thread will melt first before said heat adhesive thread melts to thereby release the fastening of said heat adhesive thread to said tape main body by said fastening thread before said heat adhesive thread is subsequently melted by the continued application of said heat, said heat adhesive thread thereby melting and fusing to said fabric material to form a finished hem while substantially precluding shrinkage of said tape main body.

2. A heat adhesive tape according to claim 1, wherein said heat adhesive thread is exposed on one surface of said main body.

3. A fabric material for joining to another fabric material, comprising a body of heat resistant fabric material, at least one heat adhesive thread attached to said body and at least one fastening thread meltable at a lower temperature than said heat adhesive thread for attaching said heat adhesive thread to said body, said heat adhesive thread and said fastening thread being constructed and arranged such that upon application of heat thereto, said fastening thread will melt first before said heat adhesive thread melts to thereby release the fastening of said heat adhesive thread to said body by said fastening thread before said heat adhesive thread is subsequently melted by the continued application of heat, said heat adhesive thread thereby melting and fusing to said other fabric material while substantially precluding shrinkage of said body in a longitudinal direction.

4. A heat adhesive tape according to claim 1 wherein said tape main body has a portion of small width extending over its entire length at the center of the width thereof and having a reduced knitting or weaving density.

5. A heat adhesive tape according to claim 1 wherein said tape main body fabric is a woven material.

6. A heat adhesive tape according to claim 1 wherein said tape main body fabric is a knitted material.

7. A heat adhesive tape according to claim 1 wherein said heat adhesive thread of thermoplastic resin is woven into said main body.

8. A heat adhesive tape according to claim 1 wherein said heat adhesive thread of thermoplastic resin is knitted into said main body.

9. A heat adhesive tape according to claim 1 wherein said heat adhesive thread of thermoplastic resin is disposed in a wavy form.

10. A heat adhesive tape according to claim 1 wherein said heat adhesive thread of thermoplastic resin is disposed in the form of a series of generally U-shaped turns.

11. A heat adhesive tape according to claim 1 wherein said heat adhesive thread is disposed in said zigzag fashion along the longitudinal length of said tape main body and extends over at least a portion of the width of said main body.

12. A heat adhesive tape according to claim 11 wherein said heat adhesive thread extends generally transversely back and forth along said width portion.

13. A heat adhesive tape according to claim 11 wherein said zigzag disposed heat adhesive thread has ridges at the outer part of said width portion and furrows at the inner part of said width portion, said fastening thread fastening said heat adhesive thread to said tape main body at said furrows.

14. A heat adhesive tape according to claim 1 wherein said heat adhesive thread has a melting temperature of from 120° to 140° C.

15. A heat adhesive tape according to claim 1 wherein said fastening thread has a melting temperature of from 60° to 80° C.

16. A heat adhesive tape according to claim 13 wherein said zigzag heat adhesive thread is provided in two inner and outer rows symmetrically at each side of said tape main body on one surface thereof, said fastening thread being a low-melting fastening thread which fastens both the furrows of said heat adhesive thread in said outer row and said ridges of said heat adhesive thread in said inner row to said tape main body.

17. A method of forming a hem or the like on fabric material comprising disposing a heat adhesive thread in zigzag fashion along at least a portion of a tape main body, fastening said heat adhesive thread to said tape body by a fastening thread, said fastening thread having a lower melting temperature than said heat adhesive thread, placing said tape main body on said fabric material at the hem to be formed, and applying heat to said tape main body to initially melt said fastening thread to effect unfastening of said heat adhesive thread prior to melting of said heat adhesive thread and to subsequently melt said unfastened heat adhesive thread upon the continued application of heat, whereby shrinking of said tape body is substantially precluded as said tape main body is thereby affixed to said fabric material to form said finished hem.

18. A method of forming a hem or the like according to claim 17 wherein said heat adhesive thread melts at a temperature of from 120° to 140° C.

19. A method of forming a hem or the like according to claim 17 wherein said fastening thread melts at a temperature of from 60° to 80° C.

20. A method of forming a hem or the like according to claim 17 wherein said heat adhesive thread is disposed on one side of said tape main body.

21. A method of forming a hem or the like according to claim 17 wherein said heat is applied by pressing an iron on said tape main body.

22. A method of joining fabric material comprising disposing a heat adhesive thread on one fabric material to be joined, fastening said heat adhesive thread to said one fabric material by a fastening thread, said fastening thread having a lower melting temperature than said heat adhesive thread, placing said one fabric material on another fabric material to be joined, and applying heat to said one fabric material to initially melt said fastening thread to effect unfastening of said heat adhesive thread prior to melting of said heat adhesive thread and to subsequently melt said unfastened heat adhesive thread upon the continued application of heat, whereby shrinking of said one fabric material is substantially precluded as said one fabric material is thereby affixed to said other fabric material.

* * * * *